United States Patent [19]

Bieber

[11] Patent Number: 5,788,028
[45] Date of Patent: Aug. 4, 1998

[54] METHOD FOR COMPENSATING A CONTROL SIGNAL FOR A SHOCK ABSORBER OF A MOTOR VEHICLE

[75] Inventor: Martin Bieber, Redford, Mich.

[73] Assignee: Ford Motor Company, Dearborn, Mich.

[21] Appl. No.: 629,207

[22] Filed: Apr. 8, 1996

[51] Int. Cl.[6] ................................................. B60G 11/26
[52] U.S. Cl. ...................... 188/266.6; 188/276; 280/707
[58] Field of Search .................................. 188/276, 299, 188/319; 280/707, 714; 364/424.046, 424.047, 424.048; 374/27, 54

[56] References Cited

U.S. PATENT DOCUMENTS

| | | | |
|---|---|---|---|
| 3,584,712 | 6/1971 | Dickinson . | |
| 4,650,042 | 3/1987 | Knecht et al. | 188/299 |
| 4,802,561 | 2/1989 | Knecht et al. . | |
| 4,869,596 | 9/1989 | Klein et al. . | |
| 5,043,649 | 8/1991 | Murakami et al. . | |
| 5,062,658 | 11/1991 | Majeed | 280/707 |
| 5,103,397 | 4/1992 | Ikemoto et al. . | |
| 5,163,706 | 11/1992 | Maguran et al. | 188/299 |
| 5,199,854 | 4/1993 | Aoyama . | |
| 5,200,895 | 4/1993 | Emura et al. | 280/707 |
| 5,282,645 | 2/1994 | Spakowski et al. | 188/299 |
| 5,305,860 | 4/1994 | Rotharmel et al. . | |
| 5,350,983 | 9/1994 | Miller et al. . | |
| 5,392,885 | 2/1995 | Patzenhauer et al. . | |
| 5,532,195 | 7/1996 | Miller . | |
| 5,579,229 | 11/1996 | Maguran | 260/707 |

FOREIGN PATENT DOCUMENTS

| | | |
|---|---|---|
| 4027-796-A | 3/1992 | Germany . |
| 2234041 | 1/1991 | United Kingdom . |

*Primary Examiner*—Chris Schwartz
*Attorney, Agent, or Firm*—Gregory P. Brown

[57] ABSTRACT

A method is shown for determining an operating temperature of a continuously variable hydraulic shock absorber and compensating a control signal therefore. A solenoid 62 provides continuous variability in the damping level a shock absorber produces. The solenoid includes a coil 70 which may be used to determine the temperature of the hydraulic fluid in the shock absorber. An electronic controller 68 uses the temperature to compensate a desired damping signal to account for temperature variations. This allows the shock absorber to provide consistent damping levels for the vehicle throughout a broad temperature range, thereby improving the noise, vibration and harshness characteristics of the vehicle.

8 Claims, 3 Drawing Sheets

METHOD FOR COMPENSATING A CONTROL SIGNAL FOR A SHOCK ABSORBER OF A MOTOR VEHICLE

BACKGROUND OF THE INVENTION

1. Field of the Invention

This invention relates to a method for controlling shock absorbers used on a vehicular suspension system. More particularly, the present invention relates to compensating shock absorber control signals for effects due to environmental as well as operating temperature variations.

2. Disclosure Information

It is well known to control damping levels provided by shock absorbers for motor vehicles. Many vehicles include electronically controlled shock absorbers capable of being switched between a soft ride or low damping level and a firm ride or high damping level. The control may be manual or electronic depending on the sophistication of the control system employed. For instance, on vehicles having sophisticated control systems, it is desirable to determine the motion of the wheel relative to the vehicle chassis, and select a high or low damping level as appropriate. Normally, the low damping level would be selected to provide desirable noise, vibration and harshness (NVH)characteristics associated with normal driving. The control system would then select the high level damping when aggressive braking, acceleration and steering is detected. This has the effect of reducing the pitch, dive and roll of the vehicle, without compromising the ride quality under normal operation. However, there are considerable problems associated with such "two" state shock absorbers.

A more recent development in controlling shock absorber damper level includes continuously variable shock absorbers. These shock absorbers solve many of the problems associated with the earlier two state shock absorbers by providing a continuously variable damper level. By either measuring the wheel to chassis motion, or calculating it from sensors, a desired level of damping may be provided to properly control the wheel motion relative to the chassis. However, with the continuously variable damper level, it has been observed that in addition to being better at doing what two state shock absorbers could do, the continuously variable shock absorbers can be adjusted to compensate for other system conditions, thereby improving the overall system performance.

It is an object of the present invention to provide a controlled shock absorber capable of compensating a desired damper level to account for environmental as well as operating temperature fluctuations.

SUMMARY OF THE INVENTION

The present invention provides a unique, cost effective method for compensating a shock absorber control signal for temperature variations. The temperature compensation improves the consistency of damping level provided by shock absorbers when subjected to varying operating temperatures.

In accordance with the present invention, a method for selectively controlling a damping level of a hydraulic shock absorber filled with hydraulic fluid comprising the steps of:

determining a desired damping level for the shock absorber and generating a first signal corresponding thereto;

determining an estimated temperature of the hydraulic fluid and generating a second signal corresponding thereto;

determining a temperature compensation factor based on the second signal and generating a third signal; and compensating the first signal according to the third signal and generating a shock absorber control signal for adjusting the shock absorber in accordance with the temperature compensated damping level.

Other objects, features and advantages of the present invention will become apparent to those skilled in the art from the drawings, detailed description and claims which follow.

DETAILED DESCRIPTION OF THE INVENTION

Figure 1:
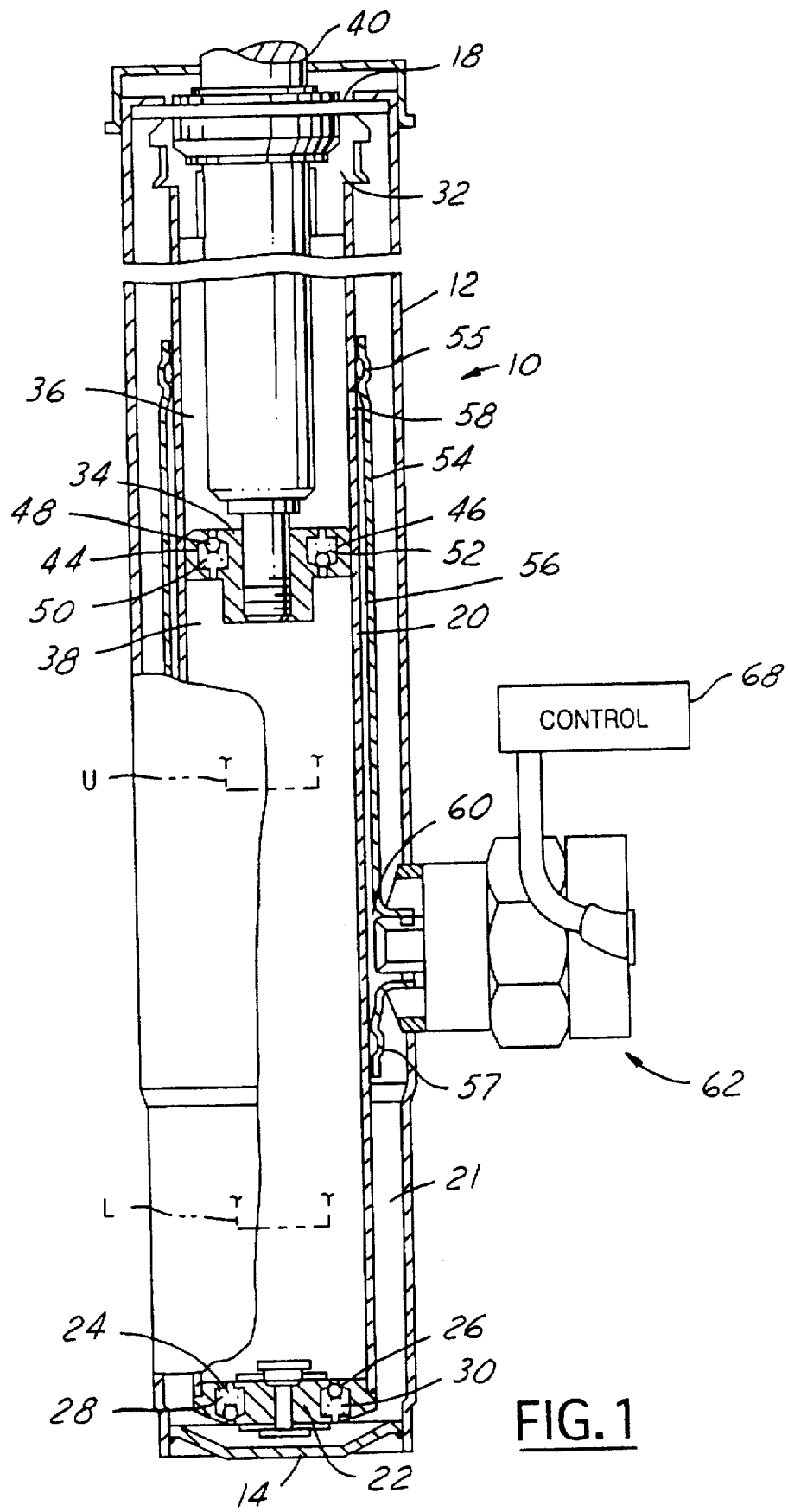
FIG. 1 is a sectional view of an adjustable hydraulic shock absorber of the invention in accordance with the present invention.

Referring now to FIG. 1, a shock absorber 10 commonly employed in automotive suspension systems is shown. It should be noted that the present invention will be described with reference to the illustrated shock absorber, it being understood that the principles described herein would provide equivalent operability and functionality if applied to an automotive strut.

The shock absorber 10 has an outer tube or housing 12 that is closed at its lower end by an end plate 14. A mounting bracket (not shown) is welded onto the housing 12 near its lower end for fastening the shock absorber to the unsprung mass of a vehicle in a well known manner. The upper end of the housing 12 is closed by an annular seal plate 18.

A pressure tube 20 is concentrically arranged within the housing 12 to define a reservoir 21 between the pressure tube 20 and the housing 12. The pressure tube 20 is closed at its lower end by a valve plate assembly 22 that has first and second ports 24, 26. The first port 24 is closed by a light spring 28 while the second port 26 is closed by a firm spring 30. The first and second ports 22 operate in a well known manner to transfer hydraulic fluid back and forth between the pressure tube 20 and the reservoir 21 during operation of the hydraulic shock absorber 10.

The upper end of the pressure tube 20 is mounted on a rod guide 32 that is seated in the housing 12 below the seal plate 18. A piston 34 reciprocates within the pressure tube 20 which is filled with hydraulic fluid and divides the pressure tube 20 into an upper rebound chamber 36 and a lower compression chamber 38. The piston 34 is attached to the end of a rod that extends though the rod guide 32 and the seal plate assembly 18. The upper end of the rod 40 has a fitting (not shown) for attaching the shock absorber 10 to the sprung mass of the vehicle in a well known manner.

The piston 34 has third and fourth ports 44, 46 that form piston valves that operate in a well known manner to transfer hydraulic fluid back and forth between the rebound chamber 36 and the compression chamber 38 during operation.

Briefly, the third port 44 is closed by a check ball 48 that is urged into a sealed position by a strong spring 50 to provide a firm piston valve that provides a firm mode of operation in the rebound direction as further explained below. The fourth port 46 is closed by lighter spring 52.

The shock absorber 10 includes an intermediate tube 54 that is mounted on the medial portion of the pressure tube 20. The intermediate tube 54 is sealed at the upper and lower ends 55, 57 to form a bypass channel 56 that communicates with the interior of the pressure tube 20 via a plurality of circumferentially spaced bleed holes 58 that extend through the pressure tube 20 at the upper end of the intermediate tube 54. The bleed holes 58 are sized and located as explained below. The intermediate tube 54 has an outlet 60 for the bypass channel 56 that communicates with the reservoir 21. The flow through the outlet 60 is continuously adjustable between open and closed positions by a solenoid valve assembly 62.

Figure 2:
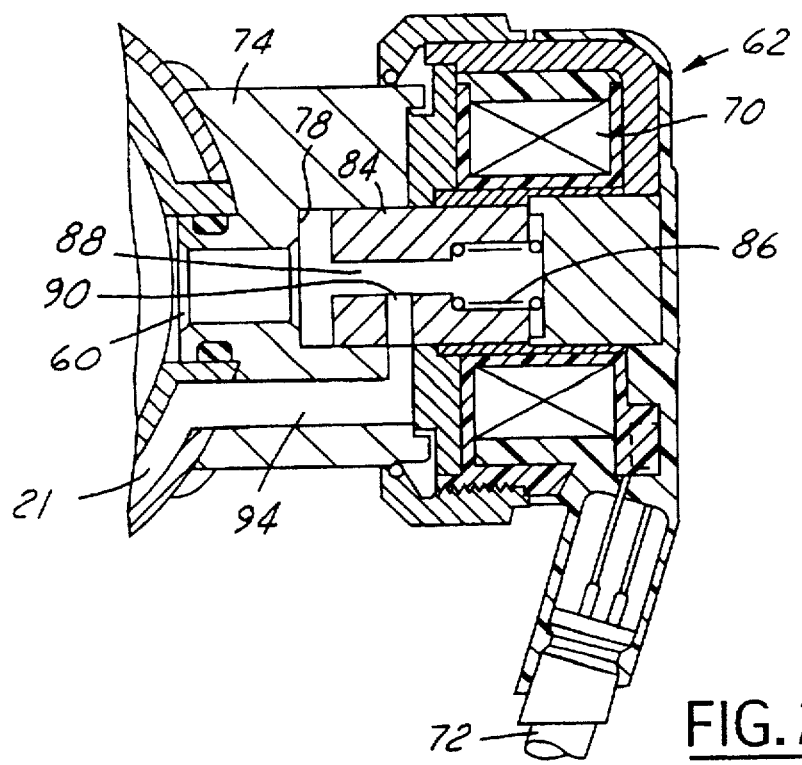
FIG. 2 is an enlargement of a solenoid valve attached to the shock absorber of FIG. 1 in accordance with the present invention.

Referring now to FIG. 2, the solenoid valve 62 is a well known type comprising a valve body 74 that is inserted into the outlet 60, an armature 84 and an armature spring 86 for urging the armature 84 against a valve seat 78 in the valve body 74. The valve body 74 and armature 84 include a plurality of axially aligned bores 88 that communicate with a metering orifice 90 that in turn communicates with the reservoir 21 via return bore 94.

Figure 3:
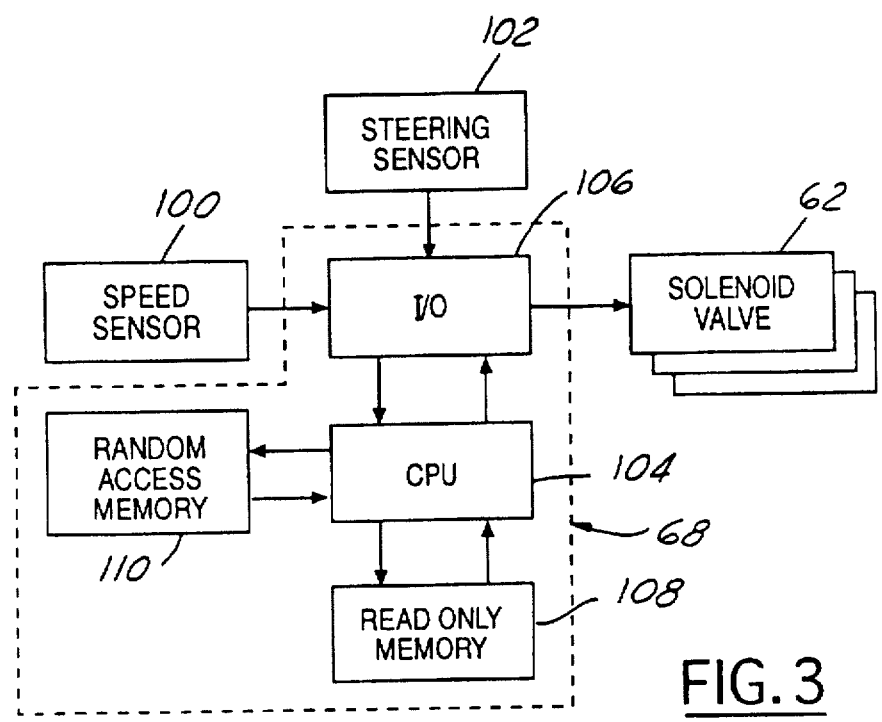
FIG. 3 is a block diagram showing a portion of a microprocessor interconnected to sensors and controlled devices which may be included in a system according to the present invention.

Referring now to FIG. 3, the solenoid valve 62 is actuated by an electronic controller 68 that receives input signals from remote sensors, for example vehicle speed 100, steering 102, load and acceleration or a combination of these parameters, can be used to determine the suspension motion of a vehicle wheel relative to a vehicle chassis. The controller 68 operates on these signals according to a programmable computer within the controller 68 and generates a damper control signal that is compensated for temperature and transmitted to coil 70 via conductor 72 to adjust the solenoid valve 62.

In the embodiment illustrated, a processor means within controller 68 operates on data provided by various sensors. Data from the sensors are fed into a central processor unit (CPU) 104, by means of input/output circuits (I/O) 106. Those skilled in the art will appreciate in view of this disclosure that the central processor and its associated peripheral equipment could be structured according to several known architectures. In a preferred embodiment, however, the processor is configured so that a control program is sequentially read for each unit command from a read-only memory (ROM), 108, which stores preset control programs. Unit commands are executed by the central processor. The I/O device serves to connect the balance of the microprocessor with the other components of the system, such as the sensors and control devices. A random access memory (RAM), 110, stores data for use by the CPU.

Figure 4A:
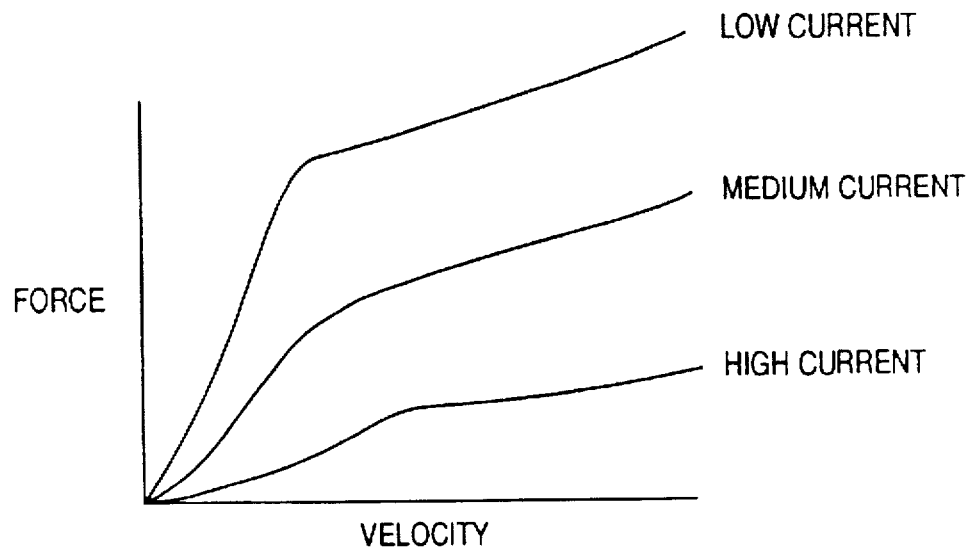
FIGS. 4A and 4B are plots showing how operating characteristics of a continuously variable shock absorber may be controlled in accordance with the present invention.

The CPU processes data from the sensors according to the preset control programs to first determine a desired damping level for each shock absorber. As an example, the desired damping level could simply be proportional to the relative velocity between the wheel and the chassis. That is, as the relative velocity increases, it may be desirable to increase the amount of damping the shock would otherwise produce. The CPU generates a first signal corresponding to this desired level of damping. Referring to FIG. 4A, a plot showing the operating relationship between damper force, velocity and the first signal (current) is illustrated. As the current is increased to the solenoid 62, the damping force increases for a given velocity input to the shock.

Referring back now to FIG. 3, the processor estimates the temperature of the hydraulic fluid and generates a second signal corresponding thereto. In the presently preferred embodiment, the electronic controller 68 uses closed loop current control to drive the solenoid valve 62, which also enables the temperature estimation. The electronic controller 68 senses the actual current flowing through the solenoid valve coil 70, and applies a voltage across the coil 70, in a known manner, such as with pulse width modulation, to achieve the desired current level. The coil resistance, which is a function of the coil temperature, can be accurately determined by dividing the average applied voltage by the average coil current. Since both the nominal (room temperature) resistance and temperature coefficient of the coil are known constants, the temperature of the coil may be calculated as follows:

$$T_{coil} = T_{nom} + \left( \frac{V_{app}}{I_{coil}} - R_{nom} \right) / K_{TempCoef}$$

where:

$V_{app}$—average applied voltage;
$I_{coil}$—average coil current;
$T_{coil}$—coil temperature;
$R_{nom}$—nominal (e.g. −25 degC.) coil resistance;
$K_{TempCoef}$—coil temperature coefficient (ohms/degC.);
$T_{nom}$−25 degC.

The circulation of fluid through the bores 88 and metering orifice 90 ensures that the armature 84 and adjacent coil 70 will have substantially the same temperature as the hydraulic fluid.

Figure 4B:
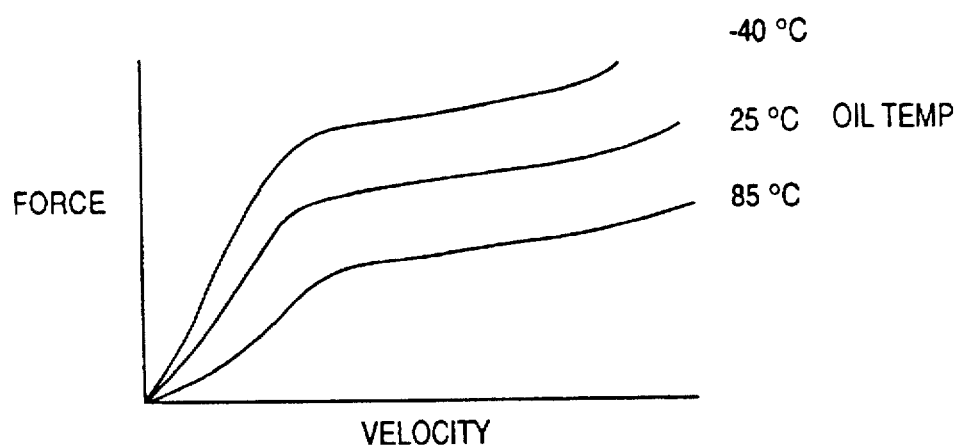

The processor proceeds to use the estimated temperature to determine a temperature compensation factor and generate a third signal representing the compensation factor. The significant advantage this has been shown to provide is consistent suspension performance in both extremely cold environments and under the elevated operating temperatures associated with severe duty operation. Referring to FIG. 4B, it can be seen that in conventional shock absorbers, the damping level varies with the operating temperature of the hydraulic fluid (oil) which is related directly to the viscosity of the fluid. This variability can cause degraded suspension performance at either extreme of the temperature scale.

With a continuously variable shock absorber, consistent damper performance can be assured for all operating temperatures when the damper control signal is compensated to take this variability into account. For example, referring to both FIGS. 4A and 4B, if the operating temperature is very low, an uncompensated control signal would yield too much damper force. However, by providing a slightly higher control signal, the damper level is compensated downward, delivering the desired damping level, in spite of the low operating temperature.

Furthermore, it has been recognized that other components of the suspension system behave differently under extreme temperature conditions, thereby presenting yet another advantage for a temperature compensated continuously variable shock absorbers. For instance, during extremely cold weather operation, actuation of the solenoid valve 62 may be slower as well as some of the normally resilient members of the suspension exhibit an unusually high stiffness. This can result in undesirable levels of noise, vibration and harshness within the vehicle until the temperature of these components increases. During this period, the shock absorber control signal may be compensated to reduce the temporary NVH degradation associated with such cold weather operation.

The processor then applies the third signal, embodying any combination of the above described temperature compensations schemes, and others, and generates a shock absorber control signal for adjusting the shock absorber to provide the desired damping level. The solenoid valve 62 adjusts the operation of the hydraulic shock absorber 10 by adjusting the damping level to substantially any desired level between a low damping level or soft mode of operation and a high damping level or firm mode of operation.

More particularly, the coil 70 is energized to retract the armature 84 which opens the solenoid valve 62 and provides a low damping level or soft mode of operation. With the solenoid valve 62 open, the hydraulic fluid that is displaced from the rebound chamber 36 as the piston 34 moves upwardly in pressure tube 20 during rebound flows through the bleed holes 58 into the bypass channel 56 and then out the outlet 60 and into the reservoir 21 via the open solenoid valve 62. However, when suspension conditions that are sensed by electronic controller 68 require firmer or higher level of rebound damping, the power to the coil 70 is reduced and the armature 84 restricts the metering orifice 90. As the metering orifice 90 on the solenoid valve 62 closes, the flow of hydraulic fluid from the rebound chamber 36 through the bypass channel 56 as the piston 34 rises in the pressure tube 20 is restricted. Consequently hydraulic pressure builds in the rebound chamber 36 providing a higher damping level or firmer mode of operation in the rebound direction. Similarly, compression strokes of the shock absorber are controlled by the solenoid valve 62.

Various modifications and variations will, no doubt, occur to those skilled in the arts to which this invention pertains. For example, the computer architecture described herein may be modified according to the individual needs of the system being designed. This system could be constructed using analog circuit devices rather than the illustrated digital devices. Similarly, the choice of which controlled devices to control using the signals is a choice within the province of the individual employing a system according to this invention. These and all other variations which basically, rely on the teachings with which this disclosure has advanced the art are properly considered within the scope of this invention as defined by the following claims.

I claim:

1. A method for selectively controlling a damping level of a hydraulic shock absorber filled with hydraulic fluid comprising the steps of:

determining a desired damping level for said shock absorber and generating a first signal corresponding thereto;

determining an estimated temperature of said hydraulic fluid by determining a temperature of a solenoid coil having an armature with said hydraulic fluid passing therethrough and generating a second signal corresponding thereto;

determining a temperature compensation factor based on said second signal and generating a third signal; and compensating said first signal according to said third signal and generating a shock absorber control signal for adjusting said shock absorber in accordance with said temperature compensated damping level.

2. A method according to claim 1, whereby said step of determining an estimated temperature of said hydraulic fluid further comprises the steps of:

measuring a current flow in a solenoid coil;

generating and applying a voltage across said coil;

determining a resistance for said coil by dividing an average of said applied voltage by an average of said current flow;

finding a quotient of a difference between a nominal resistance and said resistance and a temperature coefficient for said coil; and determining said estimated temperature by adding a nominal temperature from said quotient.

3. A method according to claim 1, wherein said step of determining a temperature compensation factor includes compensating for temperature dependencies of solenoid actuation and viscous damping.

4. A method according to claim 1, wherein said desired damping level for said shock absorber ranges continuously between a predetermined soft and hard levels.

5. A method for selectively controlling a damping level of a hydraulic shock absorber filled with hydraulic fluid comprising the steps of:

determining a desired damping level for said shock absorber and generating a first signal corresponding thereto;

determining an estimated viscosity of said hydraulic fluid by determining a temperature of a solenoid coil having an armature with said hydraulic fluid passing therethrough and generating a second signal corresponding thereto;

determining a viscosity compensation factor based on said second signal and generating a third signal; and compensating said first signal according to said third signal and generating a shock absorber control signal for adjusting said shock absorber in accordance with said viscosity compensated third signal such that said shock absorber generates said desired damping level irrespective of viscosity variations of said hydraulic fluid.

6. A method according to claim 5, wherein said step of determining an estimated viscosity of said hydraulic fluid includes determining a temperature of a solenoid coil having an armature with hydraulic fluid passing therethrough.

7. A method according to claim 5, wherein said step of determining a viscosity compensation factor includes compensating for temperature dependencies of solenoid actuation and viscous damping.

8. A method according to claim 5, wherein said desired damping level for said shock absorber ranges continuously between a predetermined soft and hard levels.

* * * * *